United States Patent
Wu et al.

(10) Patent No.: US 8,289,706 B2
(45) Date of Patent: Oct. 16, 2012

(54) TILTING PORTABLE ELECTRONIC DEVICE

(75) Inventors: Kun-Tsan Wu, Shindian (TW);
Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 206 days.

(21) Appl. No.: 12/825,484

(22) Filed: Jun. 29, 2010

(65) Prior Publication Data

US 2011/0228452 A1    Sep. 22, 2011

(30) Foreign Application Priority Data

Mar. 19, 2010 (CN) .......................... 2010 1 0127314

(51) Int. Cl.
*H05K 7/14* (2006.01)
(52) U.S. Cl. ........... 361/679.56; 361/679.01; 455/575.3; 455/575.4
(58) Field of Classification Search ....... 361/679.01–679.61; 455/575.1–575.4; 379/433.11–433.13
See application file for complete search history.

(56) References Cited

U.S. PATENT DOCUMENTS

| 7,278,184 B2 * | 10/2007 | Kuramochi ..................... 16/357 |
| 2008/0174942 A1 * | 7/2008 | Yang et al. ..................... 361/680 |
| 2011/0136553 A1 * | 6/2011 | Jo ............................... 455/575.3 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A tilting portable electronic device includes a housing, a cover, a sliding mechanism and a rotating member. The sliding mechanism includes a connecting plate and at least one elastic member, the connecting plate rotatably connects with the cover, the elastic member connects to the connecting plate and the housing, the rotating member rotatably connects to the cover and the housing. When the cover is pushed by a force, one end of the cover slides along the surface of the housing with the connecting plate; the rotating member rotates to support the other end of the cover, after the sliding plate sliding over a predetermined distance, the elastic member releases energy to drive the connecting plate sliding further automatically, and the cover opens tilted relative to the housing.

17 Claims, 3 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| Attorney Docket No. | Title | Inventors |
| --- | --- | --- |
| 12/825,459 | TILTING PORTABLE ELECTRONIC DEVICE | Kun-Tsan Wu et al. |
| 12/825,462 | TILTING PORTABLE ELECTRONIC DEVICE | Kun-Tsan Wu et al. |
| 12/825,471 | TILTING PORTABLE ELECTRONIC DEVICE | Kun-Tsan Wu et al. |
| 12/825,474 | TILTING PORTABLE ELECTRONIC DEVICE | Kun-Tsan Wu et al. |
| 12/825,477 | TILTING PORTABLE ELECTRONIC DEVICE | Kun-Tsan Wu et al. |
| 12/825,483 | TILTING PORTABLE ELECTRONIC DEVICE | Kun-Tsan Wu et al. |
| 12/825,484 | TILTING PORTABLE ELECTRONIC DEVICE | Kun-Tsan Wu et al. |
| 12/825,488 | TILTING PORTABLE ELECTRONIC DEVICE | Kun-Tsan Wu et al. |

BACKGROUND

1. Technical Field

The present disclosure relates to tilting portable electronic devices.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device resting on a table, they must use external support to hold it in a tilted position to give the display a better viewing angle. Alternatively, the user may hold the electronic device with his hands to get the proper viewing angle, however, it may become uncomfortable after a long time of viewing.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
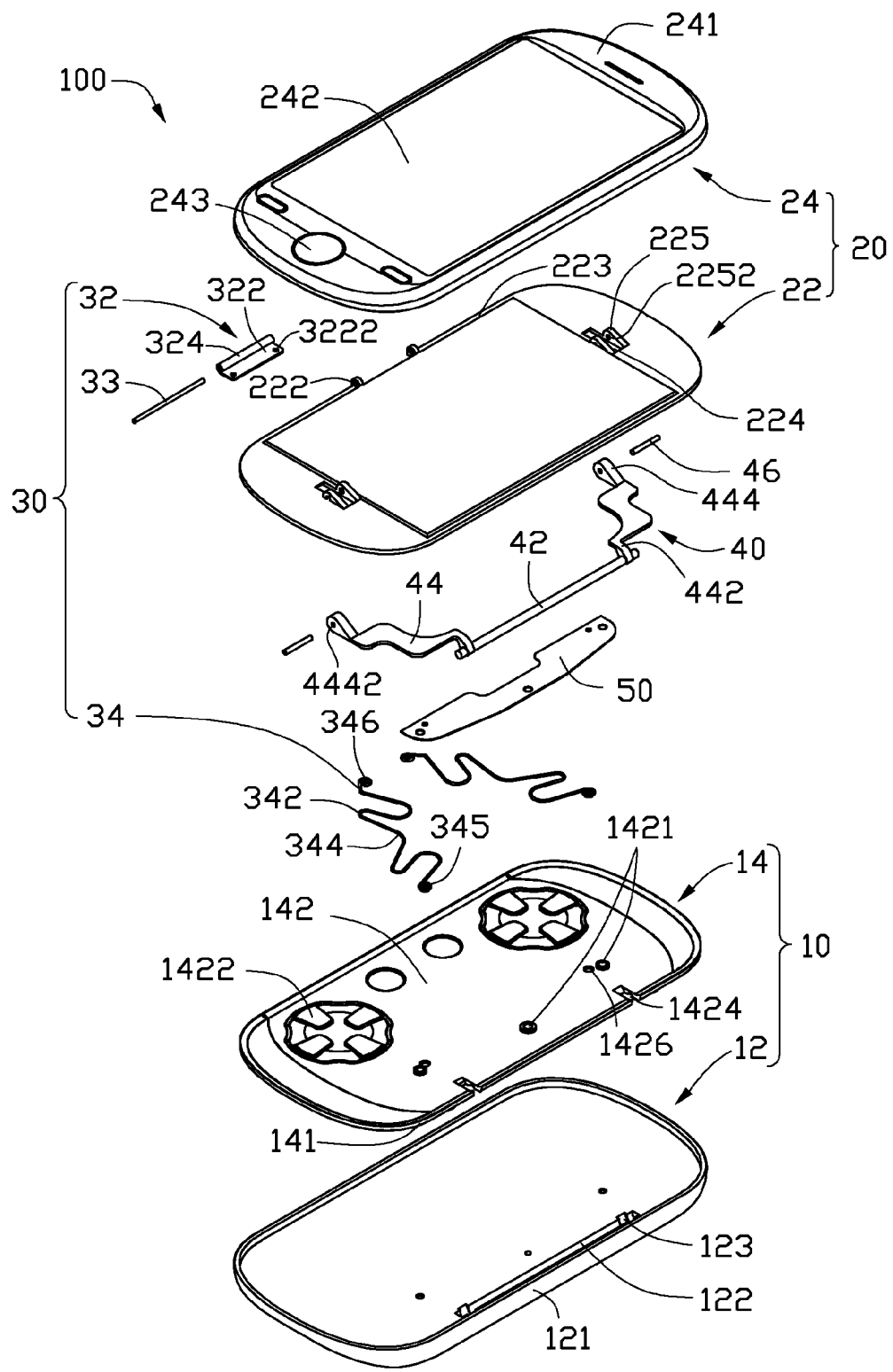
FIG. 1 is an exploded view of a tilting portable electronic device, according to an exemplary embodiment.

FIG. 1 shows a tilting portable electronic device 100, such as mobile phones, personal digital assistants (PDAs), digital cameras, including a housing 10, a cover 20, a sliding mechanism 30, and a rotating member 40. The cover 20 can slide and tilt relative to the housing 10. The sliding mechanism 30 slidably connects the housing 10 to the cover 20, and the rotating member 40 rotatably connects to the housing 10 and the cover 20. The sliding mechanism 30 and the rotating member 40 can cooperatively support the cover 20 tilted relative to the housing 10.

The housing 10 includes a lower base 12 and an upper base 14. The lower base 12 defines a receiving slot 122 extending substantially longitudinally along a first end wall 121, and substantially adjacent to the first end wall 121. The receiving slot 122 defines a clamping slit 123 crossing the receiving slot 122. The upper base 14 has an upper surface 142 and a second end wall 141 corresponding to the first end wall 121. The upper surface 142 has a plurality of connecting poles 1421 and two keypads 1422 arranged thereon. The connecting poles 1421 are arranged substantially adjacent to the second end wall 141. The two keypads 1422 are positioned substantially adjacent to the end wall opposite to the second end wall 141. The upper base 14 defines two cutouts 1424 and two first fixing holes 1426 therein. The two cutouts 1424 run through the second end wall 142, corresponding to the clamping slit 123 of the lower base 12. The two first fixing holes 1426 near the second end wall 141 are configured for connecting the sliding mechanism 30.

The cover 20 includes a sliding plate 22 and a detachable top plate 24. The sliding plate 22 forms two spaced-apart bushing rings 222 on a third end wall 223 substantially parallel with the end walls 121 and 141. The sliding plate 22 defines two opposite engaging holes 224 substantially adjacent to the two sides. The engaging holes 224 extend lengthwise substantially perpendicular with the third end wall 223. Portions of the two long sides of each engaging hole 224 form a protruding block 225 defining a first axial hole 2252. The top plate 24 has an outer surface 241 having a display 242 and a plurality of function keys 243 formed thereon.

The sliding mechanism 30 includes a connecting plate 32 and two elastic members 34. The connecting plate 32 includes a main plate portion 322 and a sleeve portion 324 extending along an end of the main plate portion 322. The main plate portion 322 defines two second fixing holes 3222 adjacent to the two sides for fastening one end of each elastic member 34. The sleeve portion 324 can be precisely received in the area between the two bushing rings 222. A shaft 33 passes through the two bushing rings 322 and the sleeve portion 324, rotatably connecting the connecting plate 32 and the sliding plate 22. The elastic member 34 may be an irregular linear-shaped spring, comprising a plurality of irregular wave crest sections 342 and wave furrow sections 344. Each elastic member 34 has a first connecting end 345 and a second end 346 defined at the opposite two ends. The first connecting end 345 fastens into the first fixing hole 1426 of the upper base 14. The second connecting end 346 fastens into the second fixing hole 3222 of the connecting plate 32.

The rotating member 40 includes a main shaft 42 and two opposite connecting arms 44, each arm extending substantially laterally adjacent to one of the ends of the main shaft 42. The main shaft 42 can be received in the receiving slot 122 of the lower base 12. Each connecting arm 44 includes a first connecting portion 442 and a second connecting portion 444. The first connecting portion 442 is located at the one end of the connecting arm 44, protruding substantially laterally from the main shaft 42, and passing through the cutout 1424 of the upper base 14. The second connecting portion 444 is located at the other end of the connecting arm 44, and defines a second axial hole 4442 engaging with the first axial hole 2252 of the sliding plate 22. A pin 46 can be inserted into and pass through the first axial hole 2252 and the second axial hole 4442, to rotatably connect each connecting arm 44 with the sliding plate 22.

Figure 2:
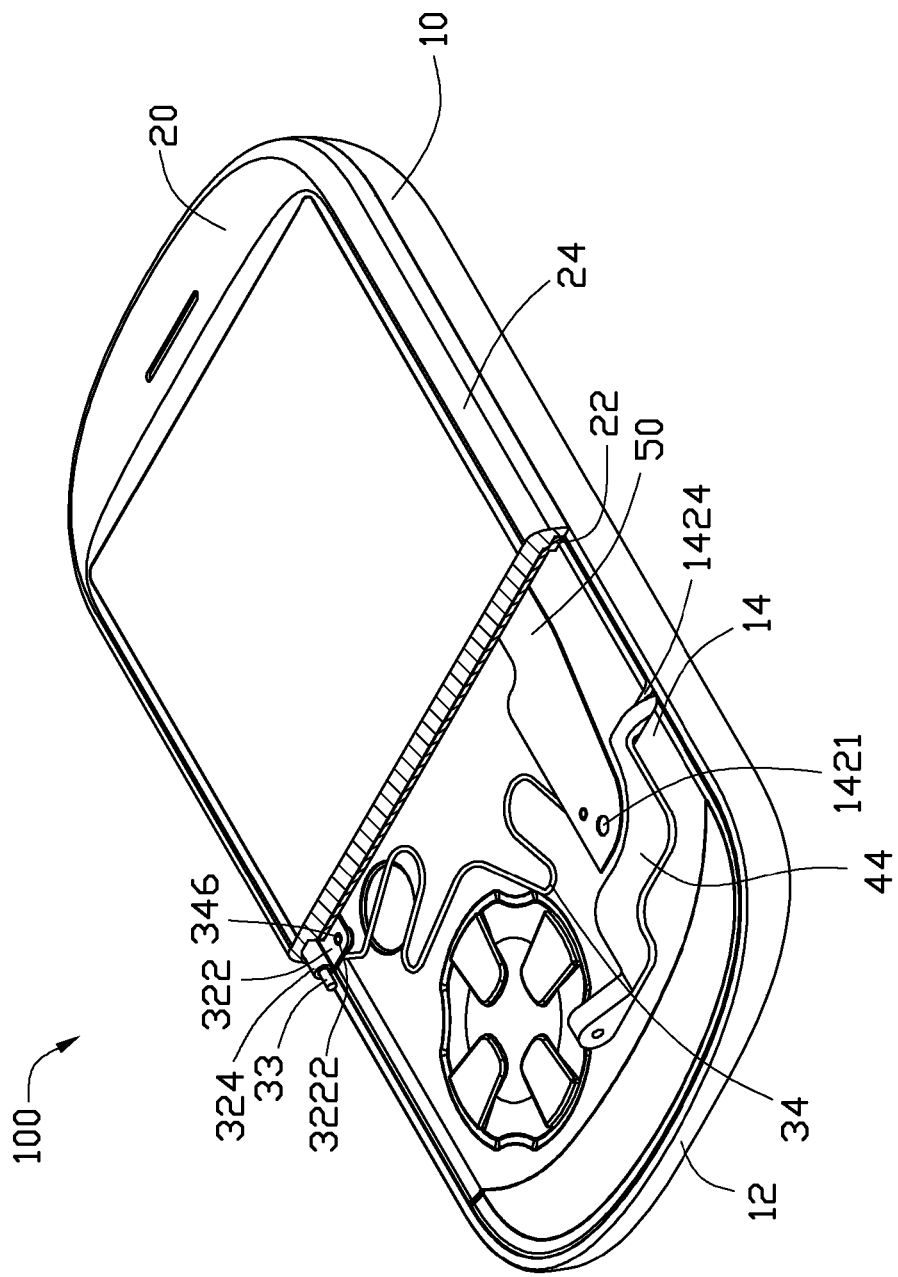
FIG. 2 is a partially sectional isometric view of the electronic device shown in FIG. 1 in closed.

Referring to FIG. 2, to assemble the portable electronic device 100, the rotating member 40 is assembled in the lower base 12, and the main shaft 42 is placed into the receiving slot 122. The upper base 14 is attached on the lower base 12 with the first connecting portion 442 of each connecting arm 44 passing through the cutout 1424, and the connecting arm 44 together with the main shaft 42 to be rotatably relative to the cutout 1424. The second connecting portion 444 of each connecting arm 44 passes through the engaging hole 225 of the sliding plate 22, with the second axial holes 4442 aligning with the first axial holes 2252. The pin 46 passes through the first axial hole 2252 and the second axial hole 4442, rotatably connecting the connecting arm 44 with the sliding plate 22. The sliding mechanism 30 is assembled with the two elastic members 34 connecting the upper plate 14 and the connecting plate 32. The first connecting end 345 of each elastic member 34 fastens with the first fixing hole 1426 of the upper base 14, and the second connecting end 346 of each elastic member 34 fastens with the second fixing hole 3222 of the connecting plate 32. The connecting plate 32 is assembled with the sliding plate 22. The sleeve portion 324 is received in the area between the two bushing rings 222 of the sliding plate 22. The shaft 33 passes through the two bushing rings 322 and the sleeve portion 324, rotatably connecting the connecting plate 32 with the sliding plate 22. The top plate 24 latches with the sliding plate 22. To prevent the wave crest sections 342 or wave trough sections 344 of the elastic member 34 from arching, a fixing plate 50 is secured on the upper base 14 by fixing the connecting poles 1421 with the covering section of the elastic members 34. Thus, the portable electronic device 100 is assembled.

Figure 3:
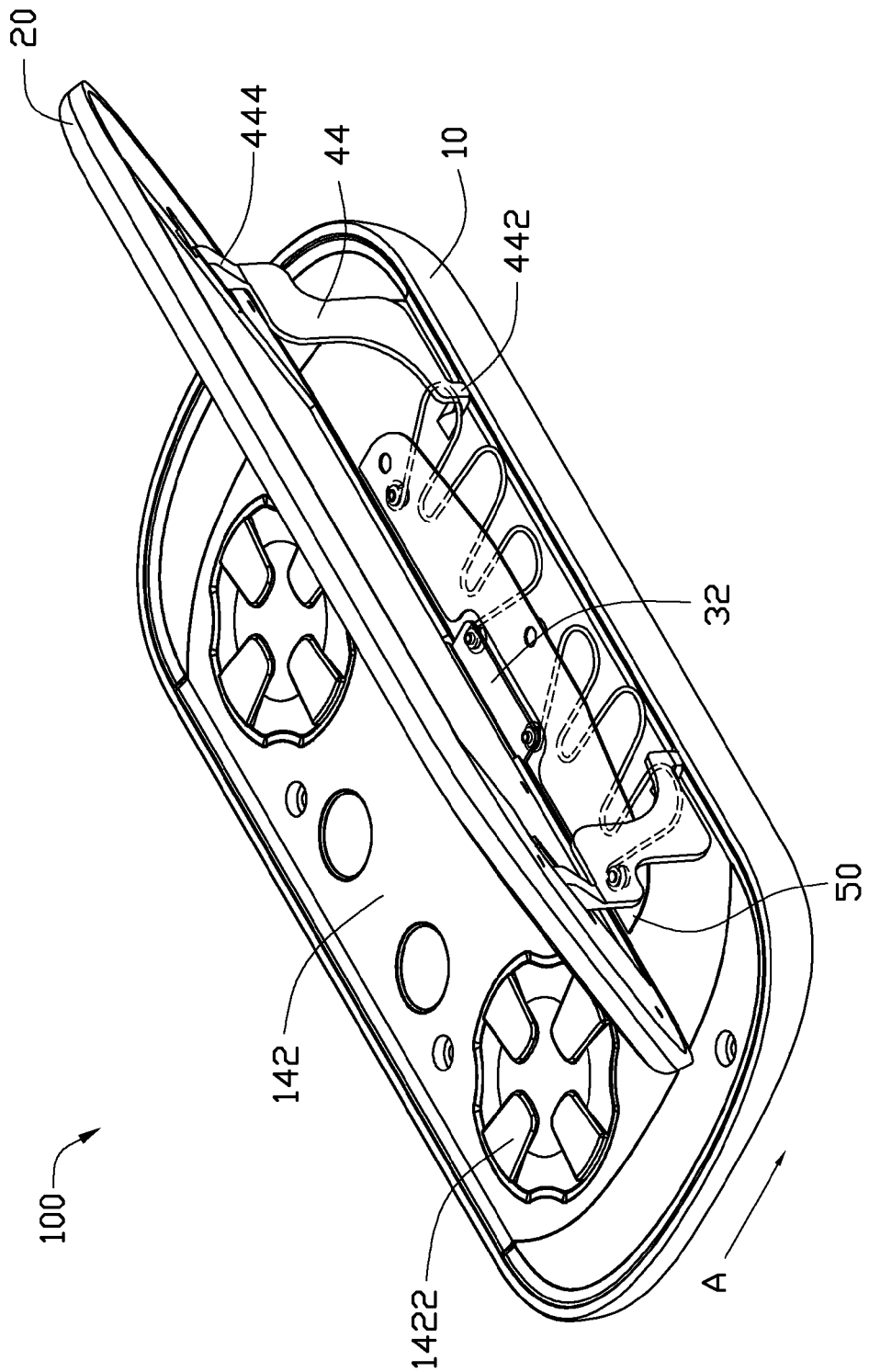
FIG. 3 is a schematic view of the electronic device shown in FIG. 1 in opening.

Referring to FIG. 3, to open the cover 20 relative to the housing 10, the cover 20 is pushed along the direction of arrow A by an external force. By the sliding mechanism 30 and the rotating member 40, the connecting plate 32 slides along the upper surface 141 of the upper base 14 with the connecting plate 32 rotated relative to the cover 20. The elastic members 34 are compressed and potential energy is accumulated. The rotating member 40 rotates and tilts the cover 20 relative to the housing 10. After the connecting plate 32 slides over a predetermined distance, the elastic member 34 releases the potential energy to push the connecting plate 32 to automatically further slide, tilting the cover 20 further, until the connecting plate 32 resists against the fixing plate 50, thus, the cover 20 cannot slide any further. The cover 20 is open completely, and tilted at an angle relative to the housing 10.

To close the cover 20 relative to the housing 10, the tilting end of the cover 20 is pressed downward by an external force. During this process, the rotating member 40 rotates in reverse, and the connecting plate 32 slides along the upper surface 141 of the upper base 14 and is restored to its original position.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A tilting portable electronic device, comprising: a housing; a cover; a sliding mechanism including a connecting plate, and at least one elastic member, the connecting plate rotatably connecting with the cover, the elastic member connecting to the connecting plate and the housing, the elastic member being an irregular linear-shaped spring, comprising a plurality of irregular wave crest sections and wave furrow sections; and a rotating member rotatably connecting to the cover and the housing; wherein when the cover is pushed by a force, one end of the cover slides along a surface of the housing with the connecting plate; the rotating member rotates to support the other end of the cover, after the cover slides over a predetermined distance, the elastic member releases energy to drive the connecting plate sliding further automatically, the cover opens tilted relative to the housing, the cover tilting relative to the housing at the same time with the sliding of the cover regardless of the sliding position of the cover relative to the housing.

2. The tilting portable electronic device as claimed in claim 1, wherein the housing includes a lower base defining a receiving slot, the rotating member includes a main shaft and two connecting arms extending laterally from the main shaft, the main shaft is received in the receiving slot, with each connecting arm extending out the receiving slot.

3. The tilting portable electronic device as claimed in claim 2, wherein the receiving slot has a clamping slit defined adjacent to each end, the housing includes an upper base engageable with the lower base, the upper base defines two cutouts corresponding to the two clamping slits, the main shaft is received in the receiving slot, with each connecting arm correspondingly passing through one of the two cutouts.

4. The tilting portable electronic device as claimed in claim 3, wherein the upper base has an upper surface arranged a plurality of connecting poles thereon, the connecting poles secures a fixing plate to hold the elastic members.

5. The tilting portable electronic device as claimed in claim 3, wherein the upper base defines two first fixing holes in the upper surface to secure one end of each elastic member.

6. The tilting portable electronic device as claimed in claim 3, wherein the cover include a sliding plate forming two spaced-apart bushing rings at a sidewall, the connecting plate includes a sleeve portion, a shaft passing through the two bushing rings and the sleeve portion rotatably connecting the connecting plate to the sliding plate.

7. The tilting portable electronic device as claimed in claim 6, wherein the sliding plate defines two engaging holes, a portion of each side of each engaging hole forming opposite protruding blocks, with each protruding block defining a coaxial first axial hole, the connecting arm defines a second axial hole at one end, a pin passes through the first axial holes and the second axial hole, rotatably connecting the connecting arm with the sliding plate.

8. The tilting portable electronic device as claimed in claim 6, wherein the cover includes a top plate engageable with the sliding plate, the top plate has an outer surface having at least one of a display and a plurality of function keys formed thereon.

9. The tilting portable electronic device as claimed in claim 6, wherein the connecting plate includes a main plate portion having the sleeve portion extending along the side thereof, the main plate portion defines two second fixing holes to fasten the other end of each elastic member.

10. A tilting portable electronic device, comprising:
a housing;
a cover;
a sliding mechanism including a connecting plate, and at least one elastic member, the connecting plate rotatably connecting with the cover, the elastic member connecting to the connecting plate and the housing, the elastic member being an irregular linear-shaped spring, comprising a plurality of irregular wave crest sections and wave furrow sections;
a rotating member rotatably connecting to the cover and the housing; and
a fixing plate fixing on the housing and covering portion of the elastic member; wherein:
when the cover is pushed by a force, one end of the cover slides along the surface of the housing with the connecting plate; the rotating member rotates to support the other end of the cover,
after the cover slides, the elastic member releases energy to drive the connecting plate sliding further automatically, until the connecting plate resists against the fixing plate and can not slide any further, the cover opens tilted relative to the housing.

11. The tilting portable electronic device as claimed in claim 10, wherein the housing includes a lower base defining a receiving slot, the rotating member includes a main shaft and two connecting arms extending laterally from the main shaft, the main shaft is received in the receiving slot, with the each connecting arm extending out the receiving slot.

12. The tilting portable electronic device as claimed in claim 11, wherein the receiving slot has a clamping slit defined adjacent to each end, the housing includes an upper base engageable with the lower base, the upper base defines two cutouts corresponding to the two clamping slits, the main shaft is received in the receiving slot, with each connecting arm correspondingly passing through one of the two cutouts.

13. The tilting portable electronic device as claimed in claim 12, wherein the upper base has an upper surface arranged a plurality of connecting poles thereon, the connecting poles secures the fixing plate to hold the elastic members.

14. The tilting portable electronic device as claimed in claim 13, wherein the upper base defines two first fixing holes in the upper surface to secure one end of each elastic member.

15. The tilting portable electronic device as claimed in claim 12, wherein the cover include a sliding plate forming two spaced-apart bushing rings at a sidewall, the connecting plate includes a sleeve portion, a shaft passing through the two bushing rings and the sleeve portion, rotatably connecting the connecting plate to the sliding plate.

16. The tilting portable electronic device as claimed in claim 15, wherein the sliding plate defines two engaging holes, a portion of each side of each engaging hole forming opposite protruding blocks, with each protruding block defining a first axial hole, the connecting arm defines a second axial hole at one end, a pin passes through the first axial holes and the second axial hole, rotatably connecting the connecting arm to the sliding plate.

17. The tilting portable electronic device as claimed in claim 15, wherein the connecting plate includes a main plate portion having the sleeve portion extending along the side thereof, the main plate portion defines two second fixing holes to fasten one end of each elastic member.

* * * * *